Jan. 10, 1939.  O. F. VON KOHORN ZU KORNEGG  2,143,252
CUTTING OR SHEARING DEVICE
Original Filed June 3, 1935    2 Sheets-Sheet 1
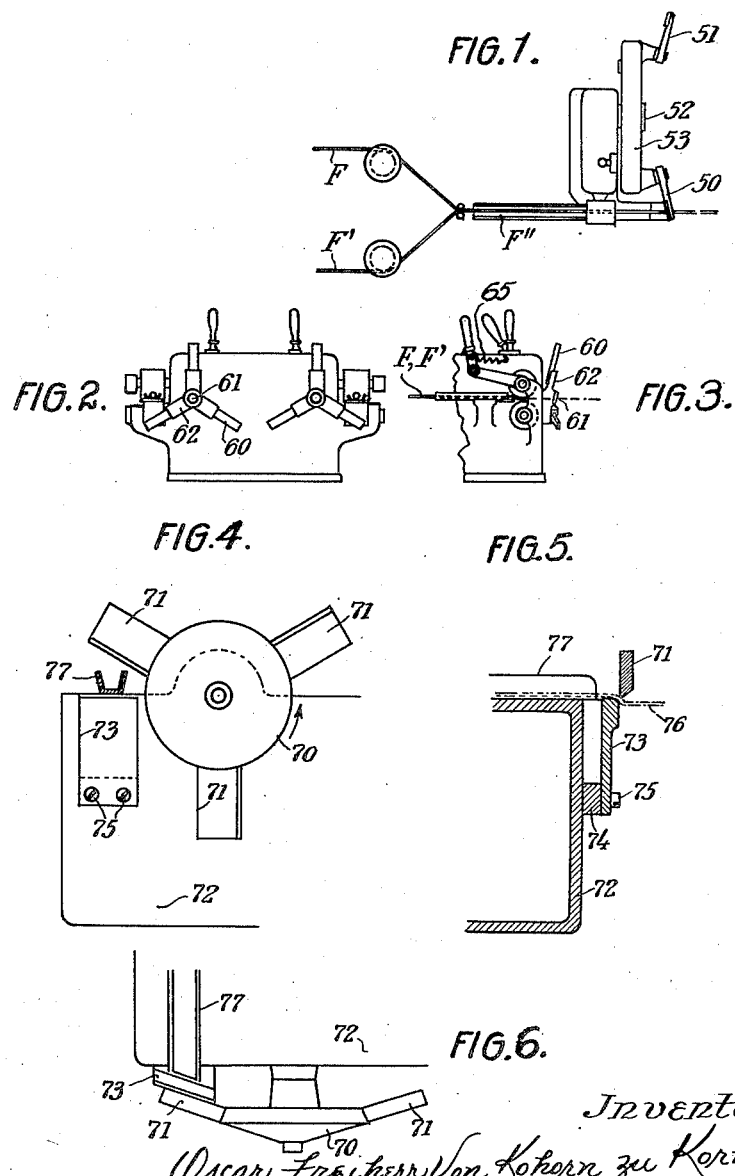

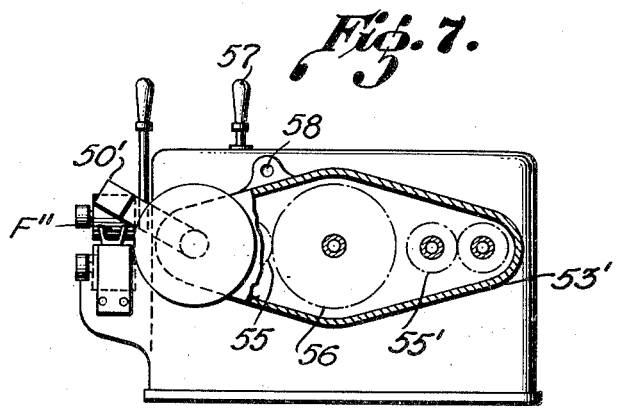
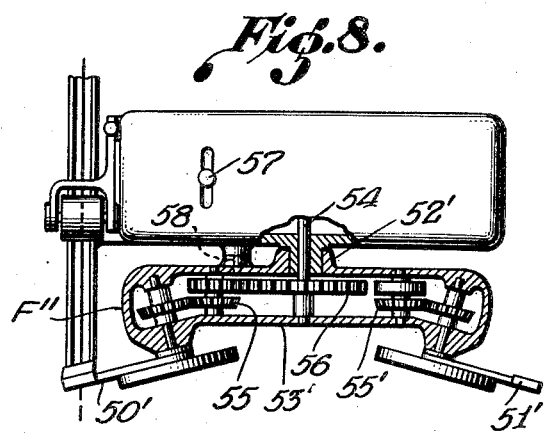
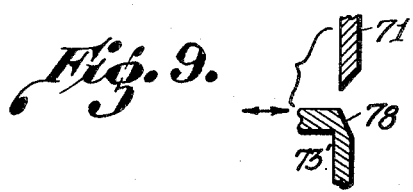

Patented Jan. 10, 1939

2,143,252

UNITED STATES PATENT OFFICE 2,143,252

CUTTING OR SHEARING DEVICE

Oscar Freiherr von Kohorn zu Kornegg, Chemnitz, Germany

Original application June 3, 1935, Serial No. 24,750. Divided and this application October 12, 1936, Serial No. 105,204

5 Claims. (Cl. 164—60)

This invention relates to cutting devices and more particularly to cutting devices having a shear-like cutting action, such as used for instance in the manufacture of staple fibers.

This is a divisional application of my application, Serial No. 24,750, filed June 3rd, 1935, for improvements in manufacture of artificial staple fibres. The features and advantages of this invention will be more fully disclosed in the following specification, reference being had to the accompanying drawings forming a part of this specification, in which:—

Fig. 1 shows a top plan view of one embodiment of my cutting device illustrated on an enlarged scale in Figs. 7 and 8.

Fig. 2 is a front elevational view of still another embodiment of the cutting device.

Fig. 3 is a side view of the cutting device shown in Fig. 2.

Fig. 4 is a partial front elevational view of a further embodiment of the cutting device.

Fig. 5 is a partial vertical sectional view of the cutting device shown in Fig. 4 a detail of which is shown in Fig. 9.

Fig. 6 is a top plan view of the cutting device shown in Fig. 4.

Fig. 7 is a partly sectional front view of a cutting device, similar to that shown in Fig. 1. Fig. 8 is a partly sectional top plan view of the cutting device of Fig. 7. Fig. 9 shows an enlarged portion of Fig. 5.

Figs. 1, 7 and 8 show the form of construction of the cutting apparatus, in which the two cutting devices 50 and 51 are mounted in a holder 53 rotatable about the pivot 52. The holder 53 may be swung into two different positions, as clearly illustrated in Fig. 12, wherein the cutting device 50' is shown in operative position, while the other cutting device 51' is idle. This is accomplished by arranging the holder or casing 52' eccentric to the driving shaft 54, so that the gearing 55 and 55' of the respective cutting devices 50' and 51' can be swung into and out of mesh with the driving centre gear 56 on shaft 54. A lever 57 releases or engages a suitable locking device 58. This device definitely locates the casing 53 in an operative position. These figures also show that the axes of the cutting devices, the latter being in the form of blade discs, may, according to this invention, also lie at an angle to the direction of the bundle of thread, an oblique cut being thereby produced which, may be desirable and advantageous because experience has shown that obliquely cut staples may be opened more readily than staples having a straight end-cut.

Figs. 2 and 3 show in front and side elevation, a special form of construction of the cutting device for oblique cutting. In this case, the cutting blades 60 are arranged on the periphery of a cone and oblique to, instead of at right angle to their supporting shafts or axes. The axis 61 is therefore located parallel to the direction of the bundles of thread F, F' meeting in front of the cutting device. Due to the fact that the axes of the rotating cutting devices can lie parallel to the path of the bundle of thread, the condition for the mounting of the conical blade holders 62 are extremely favorable, which is of extreme importance when particularly short staples are to be produced, and consequently when very considerable blade speeds are necessary.

In the case of increased speed of production, it is advisable to construct the counter-blade cooperating with the blade spider in the cutting apparatus in the form of a body having a high natural frequency of oscillation. In staple cutting, very high numbers of cut per second are in fact very necessary. If, for example, the speed of thread draw-off is 100 meters per minute, and staples of 4 cm. in length are to be produced, a cutting frequency of 2500 per minute is obtained. With this number of cuts, numerous difficulties are encountered in carrying out shear cuts, since with or without set of the cutting tools, one of the cooperating blades is preferably resiliently mounted, and the leaf or helical springs usually employed for this purpose are only satisfactory for a limited cutting period. If, however, the counter-blade is made in the form of a body of high natural frequency, the counter-blade oscillates so rapidly that it is impossible for one of the blades of the blade spider to move past the cutting plate without meeting with the counter blade, while on the other hand, when such meeting takes place, the counter blade is able to yield to the desired extent.

The construction of the counter-blade just described is shown in Figs. 4 to 6 as applied to an embodiment. Fig. 4 shows the cutting device in front view, Fig. 5 in section through the counter-blade and Fig. 6 is a plan view. A sectional view showing the edges of the cutting device is illustrated in Fig. 9.

The revolving blade head 70 provided with the blades 71 is mounted on the machine frame 72. The blade spider comprising the blade-head 70 and the blades 71 cooperate with a platelike counter-blade 73, which is inflexibly fixed by screw 88

75 to a projecting lid 74 of the machine frame 72. The counter-blade is applied against the ledge 76 in the machine frame 72 by a rectangular face which is parallel to the cutting edge. This application face, however, may be arranged at an angle to the cutting edge, which will have an effect similar to that of giving the blades a set.

In the embodiment shown, the cutting edge does not make a right angle but an angle differing from 90° with the direction of the trough 77 in which the bundle of thread 76 is fed continuously to the cutting device. This positioning produces an oblique cut of the bunch of thread, accompanied by the advantages previously referred to in the subsequent treatment thereof. Counter blade 73 is of a yielding nature and mounted in a manner, that it can oscillate like a tuning fork in a direction to the path of the threads, whenever the rotating blade 71 passes the counter blade 73. As shown in Fig. 13, the cutting edge of this blade is in form of a tapered surface 78.

Heretofore cutting devices, like those used for card-board blanks, were provided with springs to make the counter blade yield, which however introduced too much of an inert mass, limiting the number of cuts in a given period to a comparatively low magnitude. In my invention the counter blade 73 can oscillate freely, permitting a large amplitude of oscillation. It is only limited by the magnitude of the mass and material of steel, so that the number of oscillations per second is much greater than the number of cuts desired in the cutting device. Therefore the descending rotating blade ever finds the counter blade 73 in an effective place.

Cutting devices constructed according to this invention are also applicable for purposes other than that of the production of staple fibres. They are of advantage wherever high cutting speeds occur. That is to say for example when a revolving blade spider is not provided but oscillating blades or blades moving rapidly in a straight line.

It is not necessary for the counter-blade itself to be constructed in the form of a body having high natural frequency of oscillation but it is sufficient for example if it is rigidly connected with a holder which may be regarded as body having a high natural frequency. The counter-blade 73 of the constructional example shown could therefore be replaced by a thin cutting member, held in a plate-like holder, if the latter is connected to the machine frame as shown in Figs. 4 to 6. The plate-like shape is also not essential for a body of high natural frequency, but it is merely a desirable form of construction. It is merely a matter of resilient behavior of the parts 73 and 74 (Fig. 5), and not a matter of special configuration.

A preferred embodiment of this invention has been shown, but it is clear that numerous changes and omissions can be made without departing from its spirit.

I claim:—

1. A shearing device comprising a rotating blade and a stationary blade having high natural frequency of oscillation.

2. A cutting device for a plant, comprising rotating blades and a stationary blade for cutting the threads, said stationary blade being in the form of a body having a high natural frequency of oscillation.

3. A cutting device, comprising rotating blades and a stationary blade, said stationary blade being secured to a holder constructed as a body having a high natural frequency of oscillation.

4. A cutting device for a plant for the manufacture of staple fibres, comprising rotating blades and a stationary blade for cutting threads, said stationary blade being secured to a holder constructed as a body having a high natural frequency of oscillation, the cutting device being mounted so as to cut said thread at an oblique angle to its axis.

5. A cutting device for a plant for the manufacture of staple fibres, comprising rotating blades and a stationary blade for cutting threads, said stationary blade being secured to a holder and constructed as a body having a high natural frequency of oscillation, the cutting device being mounted so as to cut said thread at an oblique angle to its axis.

OSCAR FREIHERR von KOHORN
      zu KORNEGG.